United States Patent [19]

Dehnert et al.

[11] 4,113,720

[45] * Sep. 12, 1978

[54] DISPERSE AZO DYE WITH DIAMINOPYRIMIDINE COUPLING COMPONENT

[75] Inventors: Johannes Dehnert; Guenter Dunkelmann, both of Ludwigshafen, Fed. Rep. of Germany

[73] Assignee: BASF Aktiengesellschaft, Rheinland-Pfalz, Fed. Rep. of Germany

[*] Notice: The portion of the term of this patent subsequent to Dec. 24, 1991, has been disclaimed.

[21] Appl. No.: 660,985

[22] Filed: Feb. 24, 1976

Related U.S. Application Data

[63] Continuation of Ser. No. 414,409, Nov. 9, 1973, abandoned.

[30] Foreign Application Priority Data

Nov. 13, 1972 [DE] Fed. Rep. of Germany ....... 2255525

[51] Int. Cl.$^2$ .................. C09B 29/36; D06P 1/18; D06P 3/36; D06P 3/54
[52] U.S. Cl. .................. 260/154; 260/465 D; 544/320; 544/321; 544/323
[58] Field of Search .................. 260/154, 146 D

[56] References Cited

U.S. PATENT DOCUMENTS

| | | | |
|---|---|---|---|
| 2,675,375 | 4/1954 | Marson et al. | 260/154 |
| 3,042,648 | 7/1962 | Lewis | 260/154 X |
| 3,481,918 | 12/1969 | Straley et al. | 260/154 X |
| 3,531,457 | 9/1970 | Ackermann et al. | 260/154 X |
| 3,573,272 | 3/1971 | Kaupp et al. | 260/146 D |
| 3,856,772 | 12/1974 | Dunkelmann et al. | 260/154 |

FOREIGN PATENT DOCUMENTS 1,076,037  7/1967  United Kingdom ................ 260/154

*Primary Examiner*—Floyd D. Higel
*Attorney, Agent, or Firm*—Keil, Thompson & Shurtleff

[57] ABSTRACT

Disperse azo dyes having a diaminopyrimidine as coupling component. The dyes give brilliant colorations on textile material of synthetic fibers which have excellent fastness properties, including fastness to light and fastness to dry-heat pleating and setting. These disperse azo dyes are identified by the formula:

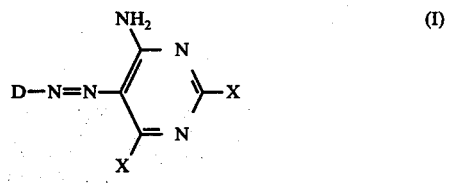

in which D is the radical of a heterocyclic diazo component or a substituted diazo component of the aniline series, one X is $NH_2$ and the other X is unsubstituted or substituted cycloalkyl, aralkyl or aryl or substituted alkyl.

5 Claims, No Drawings

DISPERSE AZO DYE WITH DIAMINOPYRIMIDINE COUPLING COMPONENT

This is a continuation of application Ser. No. 414,409, filed Nov. 9, 1973, now abandoned.

This invention is directed to a dye of the formula

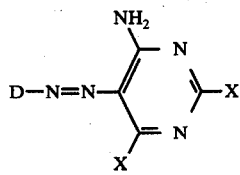
(I)

where D is phenyl substituted by chlorine, bromine, methyl, methoxy, nitro, cyano, methylsulfonyl, ethylsulfonyl, phenylsulfonyl, carbalkoxy of 2 to 5 carbon atoms, carbo-$\beta$-alkoxyethoxy, said alkoxy having 1 to 4 carbon atoms, or N,N-dialkyl sulfamoyl, said alkyl having 1 to 3 carbon atoms; phenylazophenyl; phenylazophenyl substituted by methyl, chlorine, bromine or nitro; benzthiazolyl; benzthiazolyl substituted by nitro, cyano, methylsulfonyl or ethylsulfonyl; benzisothiazolyl substituted by chlorine, bromine, cyano or nitro; thioazolyl substituted by cyano or nitro; thienyl substituted by methyl, cyano, nitro or carbalkoxy of 2 to 5 carbon atoms; or thiadiazolyl substituted by phenyl, methyl, chlorine, bromine, methylmercapto or alkoxycarbonylethylmercapto, said alkoxy having 1 to 4 carbon atoms; one X is $NH_2$ and the other X is alkyl of 1 to 6 carbon atoms substituted by alkoxy of 1 to 4 carbon atoms, phenoxy, phenoxyethoxy, benzyloxy, phenyl; cyclohexyl; norbornyl; phenyl; phenyl substituted by methyl, ethyl, methoxy, ethoxy, chloro, bromo, nitro, sulfamoyl or carbamoyl or $(CH_2)_2(OC_2H_4)_nOR$ and R is alkyl of 1 to 4 carbon atoms or benzyl and n is 1 or 2.

The essential diaminopyrimidine coupling component of the azo dyes of this invention may be symmetrical with the formula

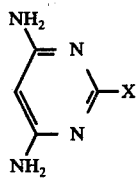
(IIa)

or they may be unsymmetrical with the formula

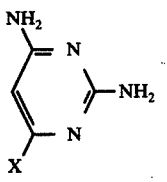
(IIb)

where the remaining X has the meanings noted above other than $NH_2$.

Particularly suitable diazo components are substituted anilines and amino compounds of the benzothioazole, benzoisothiazole, thiazole, thiadiazole, thiophene, triazole, benzotriazole, indazole or pyrazole series.

Examples of substituents for the radical D of the diazo component are as follows:

In the benzene series: chloro, bromo, nitro, cyano, trifluoromethyl, methylsulfonyl, ethylsulfonyl, phenylsulfonyl, p-($\beta$-hydroxyethyl)-phenyl-sulfonyl, carbomethoxy, carboethoxy, carbobutoxy, carbo-$\beta$-methoxyethoxy, carbo-$\beta$-ethylhexoxy, carbo-$\beta$-hydroxyethoxy, optionally N-substituted or N-disubstituted carbamoyl or sulfonamido, methyl, ethyl, methoxy, ethoxy and phenylazo.

Examples of N-substituents of the carboxamides or sulfonamides are: methyl, ethyl, propyl, butyl, $\beta$-ethylhexyl, cyclohexyl, benzyl, phenylethyl, $\beta$-hydroxyethyl, $\beta$-hydroxypropyl, $\beta$-methoxyethyl, $\gamma$-methoxypropyl or $\gamma$-ethoxypropyl and also pyrrolidone, piperidido and morpholido.

In the azobenzene series: chloro, bromo, nitro, cyano, carbomethoxy, carboethoxy, methyl, ethyl, methoxy, ethoxy, hydroxy, acetylamino, formyl, $\beta$-hydroxyethoxy and ethoxycarbonylamino.

In the heterocyclic series: chloro, bromo, nitro, cyano, methyl, ethyl, phenyl, methoxy, ethoxy, methylmercapto, $\beta$-carbomethoxyethylmercapto, $\beta$-carboethoxyethylmercapto, carbomethoxy, carboethoxy, acetyl, methylsulfonyl and ethylsulfonyl.

Examples of radicals X other than $NH_2$ are: methoxymethyl, phenoxymethyl, chlorophenoxymethyl, $\beta$-hydroxyethyl, $\beta$-benzyloxyethyl, $\beta$-acetoxyethyl, $\beta$-acetoacetoxyethyl, $\beta$-benzoyloxyethyl, $\beta$-phenoxyacetoxyethyl, $\beta$-hydroxypropyl, $\beta$-benzyloxypropyl, $\beta$-acetoxypropyl, $\beta$-acetoacetoxypropyl, $\beta$-benzoyloxypropyl, $\beta$-phenoxyacetoxypropyl, $\beta$-chloroethyl, $\beta$-chloropropyl, $\beta$-cyanoethyl, $\beta$-methoxyethyl, $\beta$-ethoxyethyl, $\beta$-phenoxyethyl, benzyl, phenylethyl, cyclohexyl, phenyl methylphenyl, chlorophenyl, methoxyphenyl, ethoxyphenyl, nitrophenyl, carbamoylphenyl, and sulfonamidophenyl. The amide groups may also be N-monosubstituted or N,N-disubstituted and the substituents may be for example alkyl ($CH_3$, $C_2H_5$, $C_4H_9$), cyclohexyl or phenyl.

Radicals D may be derived for example from the following amines: o-nitroaniline, m-nitroaniline, p-nitroaniline, o-cyanoaniline, m-cyanoaniline, p-cyanoaniline, 2,4-dicyanoaniline, o-chloroaniline, m-chloraniline, p-chloroaniline, 3,4-dichloroaniline, 2,5-dichloroaniline, 2,4,5-trichloroaniline, 2,4,6-trichloroaniline, o-bromoaniline, m-bromoaniline, p-bromoaniline, 2,4,6-tribromoaniline, 2-chloro-4-nitroaniline, 2-bromo-4-nitroaniline, 2-cyano-4-nitroaniline, 2-methylsulfonyl-4-nitroaniline, 2-methyl-4-nitroaniline, 2-methoxy-4-nitroaniline, 4-chloro-2-nitroaniline, 4-methyl-2-nitroaniline, 4-methoxy-2-nitroaniline, 1-amino-2-trifluoromethyl-4-chlorobenzene, 2-chloro-5-aminobenzonitrile, 2-amino-5-chlorobenzonitrile, 1-amino-2-nitrobenzene-4-sulfonic acid n-butylamide or $\beta$-methoxyethylamide, 2,4-dinitroaniline, 2,4-dinitro-6-chloraniline, 2,4-dinitro-6-bromoaniline, 2,4-dinitro-6-cyanoaniline, 1-amino-2,4-dinitrobenzene-6-methylsulfone, 2,6-dichloro-4-nitroaniline, 2,6-dibromo-4-nitroaniline, 2-chloro-6-bromo-4-nitroaniline, 2,6-dicyano-4-nitroaniline, 2-cyano-4-nitro-6-chloroaniline, 2-cyano-4-nitro-6-bromoaniline, 1-aminobenzene-4-methylsulfone, 1-amino-2,6-dibromobenzene-4-methylsulfone, 1-amino-2,6-dichlorobenzene-4-methylsulfone, 1-amino-2,6-dinitrobenzene-6-carboxylic acid methyl or $\beta$-methoxyethyl ester, 3,5-dichloroanthranilic acid propyl ester, 3,5-dibromoanthranilic acid $\beta$-methoxyethyl ester, N- benzoyl-p-phenylenediamine, N-acetyl-p-phenylenediamine, N-phenylsulfonyl-p-phenylenediamine, N-phenylsulfonyl-m-phenylenediamine, 4-aminoacetophenone, 3-aminobenzophenone, 2-aminobenzophenone, 2-aminodiphenylsulfone, the methyl, ethyl, propyl, butyl, isobutyl, β-ethylhexyl, cyclohexyl, benzyl, phenyl, β-methoxyethyl, β-ethoxyethyl, β-butoxyethyl, methyldiglycol, ethyldiglycol, methyltriglycol, ethyltriglycol, β-hydroxyethyl, β-acetoxyethyl, β-(β'-hydroxyethyl)-ethyl, β-hydroxypropyl, γ-hydroxypropyl, ω-hydroxybutyl or ω-hydroxyhexyl ester of 2-aminobenzoic, 3-aminobenzoic or 4-aminobenzoic acid, the methyl, isobutyl, methyldiglycol, β-methoxyethyl, β-butoxyphenyl or β-acetoxyethyl ester of 5-nitroanthranilic acid, the dimethyl, diethyl, dipropyl or dibutyl ester of 3-aminophthalic, 4-aminophthalic, 5-aminoisophthalic or aminoterephthalic acid, the amide, methylamide, propylamide, butylamide, isobutylamide, cyclohexylamide, β-ethylhexylamide, γ-methoxypropylamide, γ-ethoxypropylamide or anilide of 3-aminobenzoic or 4-aminobenzoic acid, the dimethylamide, diethyalmide, pyrrolidide or morpholide of 2-aminobenzoic, 3-aminobenzoic or 4-aminobenzoic acid, N-methyl-N-β-hydroxyethylamide, the diamide or bis-γ-methoxypropylamide of 5-aminoisophthalic acid, the bisdiethylamide of aminoterephthalic acid, the imide, β-hydroxyethylimide, γ-hydroxypropylimide, phenylimide or p-tolylimide of 3-aminophthalic or 4-aminophthalic acid, the β-hydroxyethylimide of 3-amino-6-nitrophthalic acid, the dimethylamide, diethylamide, pyrrolidide, morpholide or N-methylanilide of 2-aminobenzoic sulfonic, 3-aminobenzoic sulfonic or 4-aminobenzoic sulfonic acid, the 2'-aminophenyl, 3'-aminophenyl or 4'-aminophenyl ester of methylsulfonic acid, the 2'-aminophenyl, 3'-aminophenyl or 4'-aminophenyl ester of ethylsulfonic acid, the 2'-aminophenyl, 3'-aminophenyl or 4'-aminophenyl ester of butylsulfonic or benzenesulfonic acid, 3-aminodiphenylene oxide, 4-aminodiphenylene oxide, 2-aminobenzothiazole, 2-amino-6-methylsulfonylbenzothiazole, 2-amino-6-nitrobenzothiazole, 5,6-dichloro-2-aminobenzothiazole, 6,7-dichloro-2-aminobenzothiazole, 4-amino-5-bromo-7-nitro-1,2-benzoisothiazole, 3-amino-5-nitro-2,1-benzoisothiazole, 3-amino-5-nitro-7-bromo-2,1-benzoisothiazole, 2-aminothiazole, 2-amino-5-nitrothiazole, the ethyl ester of 2-amino-4-methylthiazole-5-carboxylic acid, 2-amino-4-methyl-5-acetylthiazole, 2-amino-3-cyano-4-methylthiophene-5-carboxylic acid esters, 2-phenyl-5-amino-1,3,4-thiadiazole, 3-methylmercapto-5-amino-1,2,4-thiadiazole, 3-β-carbomethoxyethylmercapto-5-amino-1,2,4-thiadiazole, 3-amino-1,2,4-triazole, 4-amino-7-nitrobenzotriazole, 3-aminoindazole, 3-amino-5-chloroindazole, 3-amino-5-nitroindazole, 1-benzyl-5-aminopyrazole, and 1-phenyl-5-aminopyrazole.

Examples of suitable diazo components of the aminoazo series are: 4-aminoazobenzene, 2',3'-dimethyl-4-aminoazobenzene, 3',2-dimethyl-4-aminoazobenzene, 2,5-dimethyl-4-aminoazobenzene, 2-methyl-5-methoxy-4-aminoazobenzene, 2-methyl-4',5-dimethoxy-4-aminoazobenzene, 4'-chloro-2-methyl-5-methoxy-4-aminoazobenzene, 4'-nitro-2-methyl-5-methoxy-4-aminoazobenzene, 4'-hydroxy-2-methyl-5-methoxy-4-aminoazobenzene, 4'-(β-hydroxyethoxy)-2-methyl-5-methoxy-4-aminoazobenzene, 4'-hydroxy-2,2'-dimethyl-5-methoxy-4-aminoazobenzene, 4'-hydroxy-4-aminoazobenzene, 4'-hydroxy-2'-methyl-4-aminoazobenzene, 4'-hydroxy-3'-methyl-4-aminoazobenzene, 2'-hydroxy-5'-methyl-4-aminoazobenzene, 4'-hydroxy-2-methoxy-4-aminoazobenzene, 4'-hydroxy-2'-chloro-4-aminoazobenzene, 4'-hydroxy-2,5-dimethoxy-4-aminoazobenzene, 4'-hydroxy-2,6-dichloro-4-aminoazobenzene, 4-hydroxy-3-methoxy-4-aminoazobenzene, 4'-chloro-2-methyl-4-aminoazobenzene, 4'-formyl-2-methyl-4-aminoazobenzene, 4'-(ethoxycarbonylamino)-2-methyl-4-aminoazobenzene, 2,5-dimethoxy-4-aminobenzene, 4'-chloro-2,5-dimethoxy-4-aminoazobenzene, 4'-(hydroxyethoxy)-2,5-dimethoxy-4-aminoazobenzene, 4'-chloro-2,5-dimethyl-4-aminoazobenzene, 4'-methoxy-2,5-dimethyl-4-aminoazobenzene, 4'-nitro-4-aminoazobenzene, 3,5-dibromo-4-aminoazobenzene, 2,3'-dichloro-4-aminoazobenzene, 3-methoxy-4-aminoazobenzene, 1-phenylazo-4-aminonaphthalene and 1-phenylazo-3-ethoxy-4-aminonaphthalene.

Dyes of formula (I) may be prepared by reacting a diazo compound of an amine of the general formula (III):

D—NH$_2$                             (III)

with a coupling component of the general formula (IV):

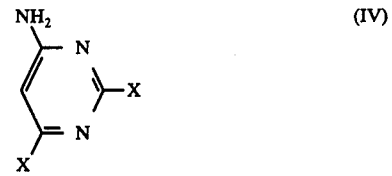
(IV)

in which D and X have the above meanings, it being understood that this coupling component (IV) may have either the symmetrical formula (IIa) or the unsymmetrical formula (IIb) as noted above.

Diazotization of the amines is carried out by a conventional method. The coupling is also carried out conventionally in an aqueous medium with or without the addition of a solvent and at a reaction which is from weakly to strongly acid.

Coupling components of formula (IV) may be prepared by reacting a compound of formula (Va) or (Vb):

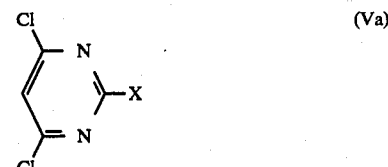
(Va)

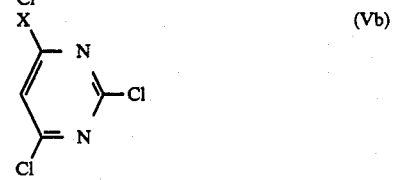
(Vb)

X being different from NH$_2$ with ammonia; coupling components of formula (IIb) may be synthesized for example also from compounds of the formula (VII)

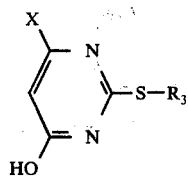

in which $R^3$ is preferably methyl or ethyl by reaction with ammonia to form 2-amino-4-hydroxy-pyrimidine derivatives of the formula (VIII):

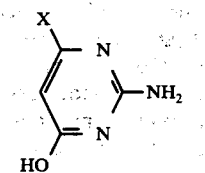

Compounds of the formula (VIII) are also accessible from guanidine and β-ketoesters. The hydroxy group in the intermediates (VIII) may be replaced by conventional reagents as for example phosphorus oxychloride by a chlorine atom which can then be displaced by ammonia.

In the production of coupling components of the formula (IV) by reaction with ammonia it is advisable to use solutions of ammonia in solvents which are inert under the reaction conditions. Water, methanol, ethanol, ethylene glycol, ethylene glycol monomethyl or dimethyl ether, dimethylformamide or N-methylpyrrolidene are suitable depending on the reaction temperature. It is also possible however to use liquefied ammonia at superatmospheric pressure without any solvent.

It is convenient to use an excess of amine or an acid-binding agent conventionally used such as a tertiary amine, magnesium oxide or an alkali to bind the hydrogen chloride liberated in the reaction.

New dyes of the formula (I) having a radical of the formula (IIa) may also be prepared by reacting a compound of the formula (IX):

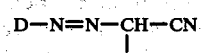

by a conventional method with an amidine of the formula (X):

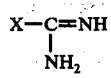

Details of the production will be found in the Examples.

Dyes of particular industrial value are those of the general formulae (Ia)

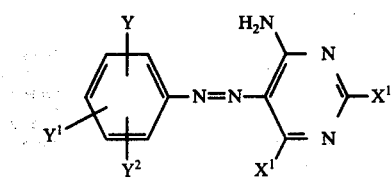

in which one $X^1$ is $NH_2$ and the other $X^1$ is phenyl, benzyl, or phenylethyl which may bear methyl, ethyl, methoxy, ethoxy, chloro or nitro as a substituent;

Y is nitro, cyano, chloro, bromo, carbomethoxy, carboethoxy, methylsulfonyl, ethylsulfonyl, methyl, methoxy, phenylazo, p-nitrophenylazo, p-hydroxyphenylazo, p-methoxyphenylazo, p-chlorophenylazo or methylphenylazo;

$Y^1$ is hydrogen, nitro, chloro, bromo, cyano, methyl, methoxy, carbomethoxy, carboethoxy, methylsulfonyl or ethylsulfonyl; and $Y^2$ is hydrogen, chloro, bromo, cyano, methyl, methoxy, carbomethoxy or carboethoxy.

The corresponding dyes which contain benzothiazole, benzoisothiazole, thiazole, thiadiazole or thiophene which may bear nitro, chloro, bromo, cyano, methyl, methylmercapto, β-carbomethoxyethylmercapto, β-carboethoxyethylmercapto, carbomethoxy, carboethoxy or acetyl as substituents as diazo components are also particularly valuable.

Particularly valuable diazo components are as follows:

4-nitroaniline, 2-chloro-4-nitroaniline, 2-bromo-4-nitroaniline, 2-cyano-4-nitroaniline, 2-methoxy-4-nitroaniline, 2-amino-5-nitrophenylsulfonic acid dimethylamide, 2-amino-5-nitrophenylsulfonic acid butylamide, 2-amino-5-nitrophenylsulfonic acid β-methoxyethylamide, 2-aminobenzonitrile, 3-chloro-4-aminobenzonitrile, 2-chloro-5-aminobenzonitrile, 2-amino-5-chlorobenzonitrile, 2,5-dichloro-4-aminobenzonitrile, 1-amino-2,4-dicyanobenzene, 1-amino-2,4-dicyano-6-chlorobenzene, 2-chloro-4-amino-5-nitrobenzonitrile, 2-amino-3-chloro-5-nitrobenzonitrile, 2-amino-3-bromo-5-nitrobenzonitrile, 2,6-dicyano-4-nitroaniline, 2,5-dichloro-4-nitroaniline, 2,6-dichloro-4-nitroaniline, 2,6-dibromo-4-nitroaniline, 2,4-dinitro-6-chloroaniline, 2,4-dinitro-6-bromoaniline, 2-amino-3,5-dinitrobenzonitrile, 1-amino-4-nitrobenzene-2-methylsulfone, 1-amino-4-nitrobenzene-2-ethylsulfone, 4-methylsulfonylaniline, 1-amino-2-chlorobenzene-4-methylsulfone, 1-amino-2,6-dibromobenzene-4-methylsulfone, 1-amino-2,6-dichlorobenzene-4-methylsulfone, 4-aminobenzoic acid esters, 2-amino-5-nitrobenzoic esters, 2-amino-3-chloro-5-nitrobenzoic esters, 2-amino-3,5-dichlorobenzoic esters, 2-amino-3,5-dibromobenzoic esters, 2-amino-3,5-dinitrobenzoic acid methyl or β-methoxyethyl ester, diethyl aminoterephthalate, 4-aminoazobenzene, 2,3'-dimethyl-4-aminoazobenzene, 2',3-dimethyl-4-aminoazobenzene, 2,5-dimethyl-4-aminoazobenzene, 4'-hydroxy-2'-methyl-4-aminoazobenzene, 3,5-dibromo-4-aminoazobenzene, 2-methyl-5-methoxy-4-aminoazobenzene, 4'-chloro-2-methyl-5-methoxy-4-aminoazobenzene, 4'-nitro-2-methyl-5-methoxy-4-aminoazobenzene, and 4'-nitro-2,5-dimethoxy-4-aminoazobenzene.

Particularly valuable heterocyclic diazo components include the following:

2-aminothiazole, 2-amino-5-nitrothiazole, 2-amino-4-methyl-5-nitrothiazole, the ethyl ester of 2-amino-4-methylthiazole-5-carboxylic acid, 2-amino-4-methyl-5-acetylthiazole, 2-amino-5-phenyl-1,3,4-thiadiazole, 3-phenyl-5-amino-1,2,4-thiadiazole, 3-methylmercapto-5-amino-1,2,4-thiadiazole, 3-β-carbomethoxyethylmercapto-5-amino-1,2,4-thiadiazole, 3-β-carboethoxyethylmercapto-5-amino-1,2,4-thiadiazole, 2-amino-6-nitrobenzothiazole, 2-amino-3-cyano-4-methylthiophene-5-carboxylic acid esters, 3-amino-5- nitro-2,1-benzoisothiazole, 3-amino-5-nitro-7-chloro-2,1-benzoisothiazole, 3-amino-5-nitro-7-bromo-2,1-benzoisothiazole, 4-amino-7-nitro-1,2-benzoisothiazole, 4-amino-5-bromo-1,2-benzoisothiazole, 4-amino-5-bromo-7-nitro-1,2-benzoisothiazole and 4-amino-5-cyano-7-nitro-1,2-benzoisothiazole.

The new dyes are yellow to red and are eminently suitable for dyeing textile materials for acrylonitrile polymers, synthetic polyamides, cellulose esters such as secondary cellulose acetate and triacetate and particularly of synthetic linear polyesters such as polyethylene glycol terephthalate and polymers having analogous chemical constitution. In some cases extremely full dyeings are obtained which are distinguished by good fastness properties, particularly good fastness to light.

The following Examples illustrate the invention.

EXAMPLE 1

15 parts of methyl anthranilate is dissolved in 200 parts by volume of water with the addition of 20 parts by volume of concentrated hydrochloric acid. The whole is cooled to 0° C., 32 parts by volume of a 23% sodium nitrite solution is added, the mixture is stirred for two hours at 0° C. and then a solution of 6.6 parts of malononitrile is 50 parts by volume of ethanol is dripped in. To complete coupling the pH of the mixture is adjusted to 5 and the deposited product of the formula:

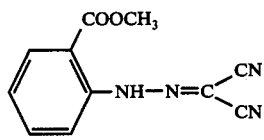

is filtered off, washed with water and dried in vacuo.

11.4 parts of the azo compound thus obtained is boiled for four hours with 7.7 parts of p-chlorobenzamidine and 5 parts of sodium methylate (30%) in 100 parts by volume of methanol. After the reaction mixture has cooled the dye of the formula:

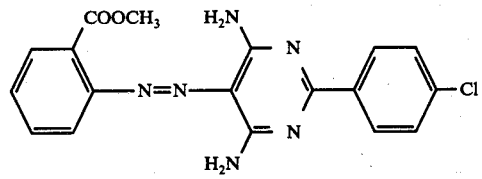

is filtered off and washed with methanol and water. When polyethylene glycol terephthalate materials are dyed therewith yellow hues having good fastness properties are obtained.

EXAMPLE 2

14.2 parts of 2-amino-5-nitrobenzonitrile is introduced into a mixture of 74 parts of concentrated sulfuric acid and 26 parts of nitrosylsulfuric acid which is cooled with ice and the mixture is stirred for six hours while cooling well. The clear diazonium salt solution is then introduced in portions into a mixture of 15 parts of 2-phenyl-4,6-diaminopyrimidine, 100 parts by volume of glacial acetic acid and 600 parts by volume of ice-water, the pH of the solution being kept at from about 2 to 3 by adding sodium acetate. After coupling is completed the dye of the formula:

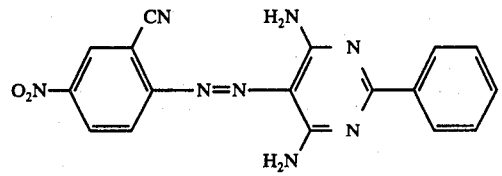

is isolated by filtration, washed with water and dried. A reddish brown powder is obtained which produces on polyester fibers orange hues of good depth of color and a high level of fastness properties.

The 2-phenyl-4,6-diaminopyrimidine required for the coupling is obtained by heating 56 parts of 2-phenyl-4,6-dichloropyrimidine with 150 parts of a concentrated aqueous solution of ammonia for fourteen hours in an autoclave at 180° C. The reaction product is allowed to cool, suction filtered and dried in vacuo.

EXAMPLE 3

4.5 parts of 2-amino-5-chlorobenzonitrile is diazotized by a conventional method in a mixture of 200 parts by volume of ice-water and 10 parts by volume of concentrated hydrochloric acid with sodium nitrite. The clear diazonium salt solution is then added to a mixture of 500 parts of ice and 5.6 parts of 2-phenyl-4,6-diaminopyrimidine which has been dissolved in 100 parts by volume of formamide. Coupling is over in a short time at a pH of from 4 to 5. The deposited dye is isolated by filtration. The compound, whose formula is

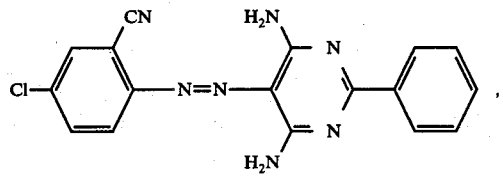

dyes polyester fibers greenish yellow hues having outstanding fastness to light and dry-heat pleating and setting.

A dye having the same formula is obtained by reacting 5.7 parts of the coupling product from 2-amino-5-chlorobenzonitrile and malononitrile with 7.8 parts of benzamidine hydrochloride in the presence of 10 parts of sodium methylate (30%) in the manner described in Example 1.

The dyes disclosed in the following Table may be prepared by the method described:

| Example No. | DK | Hue of dyeing on polyester |
|---|---|---|
| 4 | CN-phenyl | greenish yellow |

-continued

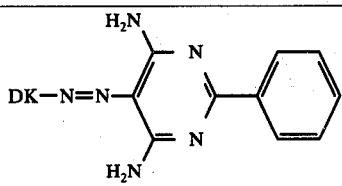

| Example No. | DK | Hue of dyeing on polyester |
|---|---|---|
| 5 | 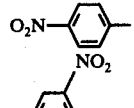 | yellow |
| 6 | 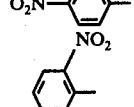 | yellow |
| 7 | 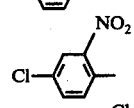 | orange |
| 8 | 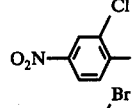 | orange |
| 9 | 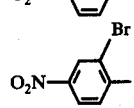 | orange |
| 10 | 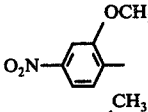 | orange |
| 11 | 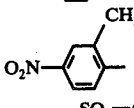 | orange |
| 12 | 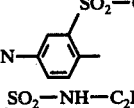 | orange |
| 13 | 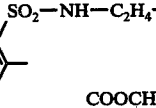 | orange |
| 14 | 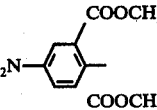 | orange |
| 15 | 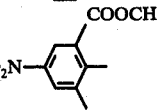 | orange |
| 16 | 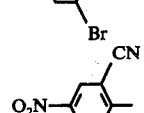 | yellowish red |
| 17 | 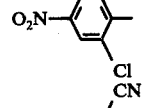 | yellowish red |
| 18 | 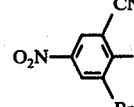 | orange |
| 19 | 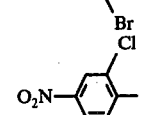 | orange |

-continued

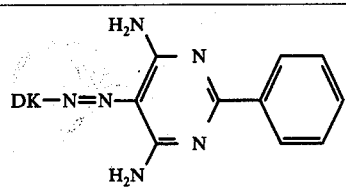

| Example No. | DK | Hue of dyeing on polyester |
|---|---|---|
| 20 | 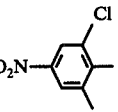 | orange |
| 21 | 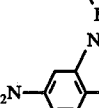 | reddish orange |
| 22 | 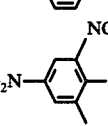 | reddish orange |
| 23 | 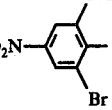 | reddish orange |
| 24 | 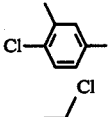 | greenish yellow |
| 25 | 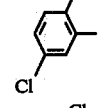 | greenish yellow |
| 26 | 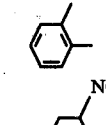 | greenish yellow |
| 27 | 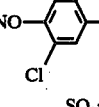 | orange |
| 28 | 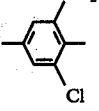 | orange |
| 29 | 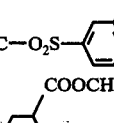 | yellow |
| 30 | 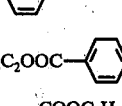 | yellow |
| 31 | 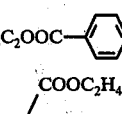 | yellow |
| 32 | 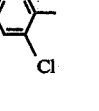 | orange |

-continued

[Structure: H₂N-substituted pyrimidine with phenyl group, DK—N=N— linkage]

| Example No. | DK | Hue of dyeing on polyester |
|---|---|---|
| 33 | [3,5-dichloro-2-methyl-phenyl with COOC₃H₇] | yellow |
| 34 | [2-methyl-3,5-dinitro-phenyl with COOCH₃] | orange-red |
| 35 | [phenyl with H₅C₂OOC and COOC₂H₅] | yellow |
| 36 | [phenyl with H₃COOC and COOCH₃] | yellow |
| 37 | [phthalimide with C₂H₄—OH] | yellow |
| 38 | [thiazole] | orange |
| 39 | [thiazoline with H₅C₂OOC and H₃C] | orange |
| 40 | [thiadiazole with H₃COOC—H₄C₂—S] | yellow |
| 41 | [6-nitrobenzothiazole] | orange |
| 42 | [thiophene with H₃C, CN, H₅C₂OOC] | red |
| 43 | [7-nitrobenzisothiazole] | red |
| 44 | [4-bromo-2-nitro-phenyl benzisothiazole] | red |
| 45 | [phenyl-N=N-phenyl] | yellowish orange |
| 46 | [2-methylphenyl-N=N-2-methylphenyl with CH₃, CH₃] | orange |
| 47 | [3-methylphenyl-N=N-phenyl with H₃C, H₃C] | orange |
| 48 | [Cl-phenyl-N=N-phenyl with OCH₃, H₃C] | orange |

EXAMPLE 49

4.5 parts of 2-amino-5-chlorobenzonitrile is diazotized with sodium nitrite in a mixture of 200 parts by volume of ice-water and 10 parts by volume of concentrated hydrochloric acid. The clear diazonium salt solution is then added together with 300 parts of ice to a solution of 5.6 parts of 2,4-diamino-6-phenylpyrimidine in 100 parts by volume of water and 30 parts by volume of 30% acetic acid. The pH of the mixture is adjusted to from 5 to 6 with sodium carbonate and the dye of the formula:

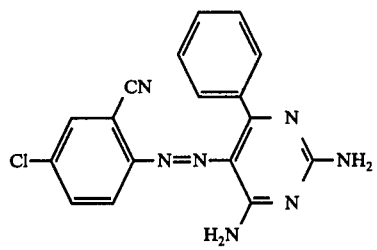

is isolated by a conventional method after the reaction is over. A golden yellow powder is obtained which produces fast yellow dyeings of good depth of color on polyester materials.

The dyes of the following Table are prepared by the said methods:

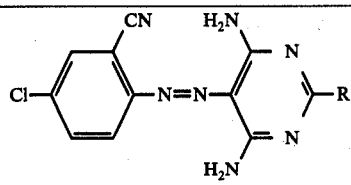

| Example No. | R | Hue of dyeing on polyester |
|---|---|---|
| 50 | p-chlorophenyl | yellow |
| 51 | o-chlorophenyl | yellow |
| 52 | p-tolyl | yellow |
| 53 | p-ethylphenyl | yellow |
| 54 | p-methoxyphenyl | yellow |
| 55 | m-nitrophenyl | yellow |
| 56 | benzyl | yellow |
| 57 | p-chlorobenzyl | yellow |
| 58 | phenylethyl | yellow |
| 59 | phenoxymethyl | yellow |
| 60 | β-benzyloxyethyl | yellow |

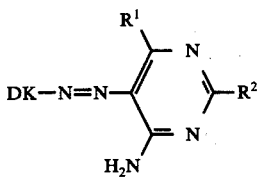

| Example No. | DK | $R^1$ | $R^2$ | Hue of dyeing on polyester |
|---|---|---|---|---|
| 61 | 2-cyanophenyl | $NH_2$ | 4-chlorophenyl | yellow |
| 62 | 2-cyanophenyl | $NH_2$ | 4-methylphenyl | yellow |
| 63 | 2-cyanophenyl | $NH_2$ | 4-methoxyphenyl | yellow |
| 64 | 2-cyanophenyl | phenyl | $NH_2$ | yellow |
| 65 | 4-nitrophenyl | phenyl | $NH_2$ | yellow |
| 66 | 4-nitrophenyl | $NH_2$ | 4-chlorophenyl | yellow |
| 67 | 4-nitrophenyl | $NH_2$ | 4-methylphenyl | yellow |
| 68 | 4-nitrophenyl | $NH_2$ | 4-methoxyphenyl | yellow |
| 69 | 3,5-dichloro-2-cyanophenyl | $NH_2$ | 4-chlorophenyl | yellow |
| 70 | 3,5-dichloro-2-cyanophenyl | $NH_2$ | 4-methoxyphenyl | yellow |
| 71 | 3,5-dichloro-2-cyanophenyl | $NH_2$ | 3-nitrophenyl | yellow |
| 72 | 2-chloro-4-nitrophenyl | phenyl | $NH_2$ | orange |

-continued

| # | R | R' | Ar | color |
|---|---|---|---|---|
| 73 | 2-Cl-4-O₂N-phenyl | NH₂ | 4-OCH₃-phenyl | orange |
| 74 | 2-Br-4-O₂N-phenyl | NH₂ | 4-OCH₃-phenyl | orange |
| 75 | 2-Br-4-O₂N-phenyl | NH₂ | 4-CH₃-phenyl | orange |
| 76 | 2-CN-4-O₂N-phenyl | NH₂ | 4-CH₃-phenyl | orange |
| 77 | 2-CN-4-O₂N-phenyl | NH₂ | 4-OCH₃-phenyl | orange |
| 78 | 2-CN-4-O₂N-phenyl | phenyl | NH₂ | orange |
| 79 | 2-CN-4-O₂N-6-Cl-phenyl | NH₂ | 4-OCH₃-phenyl | red |
| 80 | 2-CN-4-O₂N-6-Br-phenyl | NH₂ | 4-OCH₃-phenyl | red |
| 81 | 2-NO₂-4-O₂N-phenyl | NH₂ | 4-OCH₃-phenyl | red |
| 82 | 2-NO₂-4-O₂N-6-Cl-phenyl | NH₂ | 4-OCH₃-phenyl | red |
| 83 | 2-(H₅C₂OOC)-4-(COOC₂H₅)-phenyl | NH₂ | 4-Cl-phenyl | yellow |
| 84 | 2-(H₅C₂OOC)-4-(COOC₂H₅)-phenyl | NH₂ | 4-CH₃-phenyl | yellow |
| 85 | N-(2-hydroxyethyl)phthalimido | NH₂ | 4-CH₃-phenyl | yellow |
| 86 | N-(2-hydroxyethyl)phthalimido | NH₂ | 4-Cl-phenyl | yellow |

-continued

| | | | | |
|---|---|---|---|---|
| 87 | 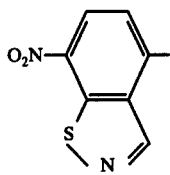 | NH$_2$ | 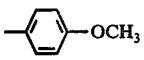 | red |
| 88 | 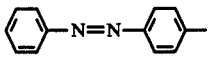 | NH$_2$ | 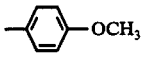 | orange |
| 89 |  | NH$_2$ |  | orange |
| 90 |  | NH$_2$ |  | orange |

We claim:

1. A dye of the formula

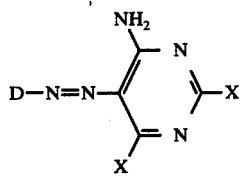

where D is phenyl substituted by chlorine, bromine, methyl, methoxy, nitro, cyano, methylsulfonyl, ethylsulfonyl, phenylsulfonyl, carbalkoxy of 2 to 5 carbon atoms, carbo-β-alkoxyethoxy, said alkoxy having 1 to 4 carbon atoms, or N,N-dialkyl sulfamoyl, said alkyl having 1 to 3 carbon atoms; phenylazophenyl; phenylazophenyl substituted by methyl, chlorine, bromine or nitro; benzthiazolyl; benzthiazolyl substituted by nitro, cyano, methylsulfonyl or ethylsulfonyl; benzisothiazolyl substituted by chlorine, bromine, cyano or nitro; thiazolyl substituted by cyano or nitro; thienyl substituted by methyl, cyano, nitro or carbalkoxy of 2 to 5 carbon atoms; or thiadiazolyl substituted by phenyl, methyl, chlorine, bromine, methylmercapto or alkoxycarbonylethylmercapto, said alkoxy having 1 to 4 carbon atoms; one X is NH$_2$ and the other X is alkyl of 1 to 6 carbon atoms substituted by alkoxy of 1 to 4 carbon atoms, phenoxy, phenoxyethoxy, benzyloxy, phenyl; cyclohexyl; norbornyl; phenyl; phenyl substituted by methyl, ethyl, methoxy, ethoxy, chloro, bromo, nitro, sulfamoyl or carbamoyl or (CH$_2$)$_2$(OC$_2$H$_4$)$_n$OR and R is alkyl of 1 to 4 carbon atoms or benzyl and n is 1 or 2.

2. A dye as claimed in claim 1 of the formula:

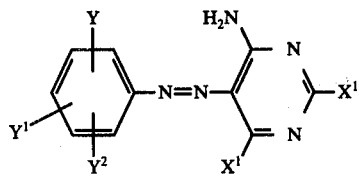

in which
one X$^1$ is NH$_2$ and the other
X$^1$ is phenylethyl, phenyl or phenyl substituted by methyl, ethyl, methoxy, ethoxy, chloro or nitro,
Y is nitro, cyano, chloro, bromo, carbomethoxy, carboethoxy, methylsulfonyl, ethylsulfonyl, methyl, methoxy, phenylazo, p-nitrophenylazo, p-chlorophenylazo or methylphenylazo;
Y$^1$ is hydrogen, nitro, chloro, bromo, cyano, methyl, methoxy, carbomethoxy, carboethoxy, methylsulfonyl or ethylsulfonyl; and
Y$^2$ is hydrogen, chloro, bromo, cyano, methyl, methoxy, carbomethoxy or carboethoxy.

3. 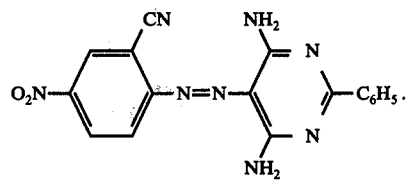

4. 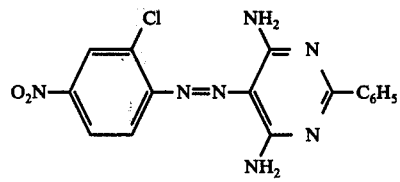

5. 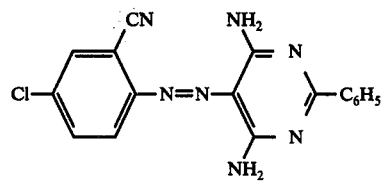

* * * * *